United States Patent
Wier et al.

(10) Patent No.: US 9,238,448 B2
(45) Date of Patent: Jan. 19, 2016

(54) BELT RETRACTOR FOR SAFETY BELTS

(75) Inventors: Isabel Wier, Schwaebisch Gmuend (DE); Franz Wier, Goeggingen (DE)

(73) Assignee: ADOLF FOEHL GMBH + CO. KG, Rudersberg (DE)

( * ) Notice: Subject to any disclaimer, the term of this patent is extended or adjusted under 35 U.S.C. 154(b) by 803 days.

(21) Appl. No.: 13/391,653

(22) PCT Filed: Aug. 20, 2010

(86) PCT No.: PCT/EP2010/005122
§ 371 (c)(1),
(2), (4) Date: May 14, 2012

(87) PCT Pub. No.: WO2011/023336
PCT Pub. Date: Mar. 3, 2011

(65) Prior Publication Data
US 2012/0234957 A1 Sep. 20, 2012

(30) Foreign Application Priority Data

Aug. 22, 2009 (DE) .......................... 10 2009 038 577
Aug. 22, 2009 (DE) .......................... 10 2009 038 578

(51) Int. Cl.
*B60R 22/34* (2006.01)

(52) U.S. Cl.
CPC ......... *B60R 22/34* (2013.01); *B60R 2022/3402* (2013.01)

(58) Field of Classification Search
USPC ........................................................ 242/379
See application file for complete search history.

(56) References Cited

U.S. PATENT DOCUMENTS

| | | | | |
|---|---|---|---|---|
| 3,695,697 A * | 10/1972 | Stoffel | ............... | B60R 22/19 24/171 |
| 3,819,197 A * | 6/1974 | Shakespear | ............ | B60R 22/02 280/806 |
| 3,876,163 A * | 4/1975 | Kobrehel | ............... | B60R 22/48 200/52 R |
| 3,906,071 A * | 9/1975 | Cook | ............... | B29C 41/14 264/255 |
| 3,917,188 A | 11/1975 | Nilsson | | |
| 3,918,658 A * | 11/1975 | Beller | ............... | B60R 22/405 242/383.4 |

(Continued)

FOREIGN PATENT DOCUMENTS

| DE | 4023662 A1 | 2/1991 |
|---|---|---|
| DE | 4438308 A1 | 4/1995 |

(Continued)

OTHER PUBLICATIONS

Russian Office Action, Mar. 31, 2014.
(Continued)

*Primary Examiner* — Emmanuel M Marcelo
*Assistant Examiner* — Angela Caligiuri
(74) *Attorney, Agent, or Firm* — Bacon & Thomas, PLLC

(57) ABSTRACT

A belt retractor for safety belts of motor vehicles comprises a housing frame made of plastic for receiving a belt reel. The housing frame 10 is designed an open, U-shaped frame, on the open front face of which a reinforcing plate 59 made of plastic is fastened. In addition, a belt retractor for safety belts of motor vehicles comprises a housing frame of plastics material for receiving a belt reel. A pawl co-operating with the belt reel is mounted in the housing frame. The pivoting path of the pawl is limited by a bearing surface formed in the housing frame.

29 Claims, 12 Drawing Sheets

(56) References Cited

U.S. PATENT DOCUMENTS

| | | | | |
|---|---|---|---|---|
| 4,040,576 A * | 8/1977 | Walker | B60R 22/40 | 242/376.1 |
| 4,082,236 A * | 4/1978 | Stephenson | B60R 22/38 | 242/383.1 |
| 4,083,512 A * | 4/1978 | Rumpf | B60R 22/405 | 242/383.4 |
| 4,273,301 A * | 6/1981 | Frankila | B60R 22/42 | 242/378.4 |
| 4,310,129 A * | 1/1982 | Morinaga | | 242/383.5 |
| 4,312,521 A * | 1/1982 | Thomas | B60R 22/40 | 242/379.1 |
| 4,372,613 A * | 2/1983 | Kitakami | B60R 22/34 | 242/377 |
| 4,386,744 A * | 6/1983 | Higbee | B60R 22/44 | 242/385.3 |
| 4,549,705 A * | 10/1985 | Fohl | B60R 22/34 | 242/376.1 |
| 4,562,977 A * | 1/1986 | Hollowell | B60R 22/353 | 242/382.1 |
| 4,565,159 A * | 1/1986 | Sweeney | A01K 61/02 | 119/53 |
| 4,620,357 A * | 11/1986 | Fohl | | 29/439 |
| 4,651,946 A * | 3/1987 | Anthony | B60R 22/353 | 242/381.3 |
| 4,673,144 A * | 6/1987 | Byford | | 242/382.6 |
| 4,795,047 A * | 1/1989 | Dunwoodie | B65D 88/14 | 220/1.5 |
| 4,878,459 A * | 11/1989 | Nelson | F24H 1/182 | 122/19.2 |
| 5,060,975 A * | 10/1991 | Sano et al. | | 280/787 |
| 5,375,787 A * | 12/1994 | Fujimura | B60R 22/405 | 242/383.2 |
| 5,441,209 A * | 8/1995 | Fujimura | B60R 22/405 | 242/384 |
| 5,443,223 A | 8/1995 | Yosin | | |
| 5,743,563 A * | 4/1998 | Juchem et al. | | 280/806 |
| 5,823,570 A * | 10/1998 | Lane, Jr. | B60R 22/3413 | 188/375 |
| 5,921,495 A * | 7/1999 | Doose | B60R 22/34 | 242/379 |
| 6,416,004 B1 * | 7/2002 | Smithson | B60R 22/34 | 242/376 |
| 6,419,178 B1 * | 7/2002 | Kohlndorfer | B60R 22/34 | 242/379.1 |
| 7,309,041 B2 * | 12/2007 | Paulsen | B60R 22/34 | 242/375 |
| 2002/0175242 A1 * | 11/2002 | Kohlndorfer | B60R 22/34 | 242/379.1 |
| 2004/0021027 A1 * | 2/2004 | Kohlndorfer | B60R 22/34 | 242/379.1 |

FOREIGN PATENT DOCUMENTS

| | | |
|---|---|---|
| DE | 20012528 U1 | 1/2001 |
| EP | 1637413 A2 | 3/2006 |
| GB | 2357468 A | 6/2001 |
| RU | 2177913 C2 | 10/2002 |
| SU | 898952 | 1/1982 |

OTHER PUBLICATIONS

Official Report from the German Patent Office, Mar. 13, 2013.

* cited by examiner

BELT RETRACTOR FOR SAFETY BELTS

TECHNICAL FIELD

The invention relates to a seat belt retractor for seat belts of motor vehicles, having a housing frame of plastic for receiving a belt reel.

BACKGROUND DISCUSSION

Belt retractors for motor vehicles essentially comprise a belt reel for receiving the belt itself and a housing frame in which this belt reel is supported. The housing frame also serves to anchor the retractor to the vehicle body or to structural parts of a vehicle seat. This housing frame is typically embodied as a bent sheet-metal part and also serves to receive and anchor the components of the locking device, the drive spring, and other—application-specific—components.

From European Patent Disclosure EP 1 637 413 B1, which generically defines the prior art, it is known to make the housing frame for a seat belt retractor as a plastic component. To that end, this seat belt retractor is said to be embodied as an injection-molded part, and a fiber-reinforced thermoplastic material is contemplated as the plastic material. This housing frame is embodied as a closed rectangular frame, which on one side has an open receiving chamber for the drive spring and on the opposite side has an open receiving chamber for the components of the locking device. The belt reel is inserted into this housing from an open face end, and for this purpose the structural length of the belt reel in the axial direction is less than the spacing of the two side walls. The support of the belt reel is accomplished by a shaft inserted through it, and the shaft can additionally have the function of a torsion bar.

SUMMARY OF THE INVENTION

It is the object of the invention to improve a generic seat belt retractor for seat belts of motor vehicles such that simplified installation of the belt reel and improved support of the belt reel are possible, and/or that torsion-proof load transmission of the reel/the locking wheel to the housing can be made possible.

Moreover, the seat belt retractor of the invention should be capable of meeting all the demands currently made by law with regard to durability, strength and breaking load. This is especially true for the demands in terms of the static and/or dynamic breaking load when a seat belt is pulled out in a straight line. Meeting these needs was among others a reason why, until now, in the development of motor vehicles on a mass-production basis, plastics were not used for housing frames of seat belt retractors.

Because the housing frame is embodied as an open, U-shaped frame, on the open face end of which a plastic reinforcement plate anchored, the installation of the belt reel can be done from the open face end of the U-shaped housing frame. The reinforcement plate, mounted after the belt reel has been installed, increases the strength of a housing frame of this type, or can additionally increase the strength of this type of housing frame, to the extent required for the demands made of a seat belt retractor for motor vehicles. In the installation of the belt reel, the U-shaped housing frame can be widened in the elastic region, so that even a belt reel whose width is greater than the spacing of the two opposed legs of the housing, for instance to enable torsion-proof load transmission to the housing frame, can be installed.

In an alternative embodiment, the seat belt retractor can have a housing frame which is embodied as an open, U-shaped frame on whose open face end a reinforcement plate, for instance of plastic, is not disposed.

The installation of the belt reel is simplified still further if the housing frame has a lesser flexural strength on its side of the middle leg opposite the anchoring point. In this lower region of the middle leg, the greatest opening width can then be attained during installation, without deviating from the range of elastic deformation of the housing frame. The belt reel is then installed from this region having the greatest possible widening.

Especially great rigidity of the housing frame is attained if the reinforcement plate is embodied in curved-arched fashion. This kind of three-dimensional embodiment of the reinforcement plate increases the rigidity considerably, compared to a flat embodiment. The curved embodiment moreover makes it possible to achieve an adaptation to the cylindrical geometry specified by the belt reel, so that in addition to the increased rigidity, there is a reduction in the structural volume.

The installation of the belt reel is simplified considerably if the middle leg of the housing frame, on its side opposite the anchoring point, has a bent, curved course toward the anchoring point. Because of this shaping, and without substantially reducing the overall strength of the housing frame, it is easier to bend the housing frame open.

A further alternative embodiment is to enable lateral installation of the reel, without relatively large reel edges, by providing that in one of the two side edges, preferably the one on the spring end, an opening is made through which the reel can be inserted. Then a fixation plate can also be produced in one piece with the housing.

The weight, volume, structural height, and cost of the housing frame are advantageously reduced if the middle leg is reduced in its thickness, beginning at the anchoring point.

Especially advantageously, additional locking or anchoring elements can be integrally formed onto the housing frame of the seat belt retractor of the invention. These elements can serve as aids in installation, by providing pre-fixation. They can also serve both during installation and in operation as a torsion prevention means. Additional anchoring points, which augment the singular screw fastening, provide for improved load distribution, and improve the vibration performance, can thus be formed on the vehicle body or at the installation site.

From EP 1 637 413 B1, which generically defines the prior art, it is known to make the housing frame for a seat belt retractor as a plastic component. To that end, this seat belt retractor is said to be embodied as an injection-molded part, and a fiber-reinforced thermoplastic material is contemplated as the plastic material. This housing frame is embodied as a closed rectangular frame, which on one side has an open receiving chamber for the drive spring and on the opposite side has an open receiving chamber for the components of the locking device. The belt reel cooperates with a detent pawl, which is rotatably supported on a bearing journal. This bearing journal is embodied as part of the housing wall. A bracing structure is also embodied integrally with the housing and is said to brace the lower region of the detent pawl in curved fashion. In a seat belt retractor of this kind, under load, if the passenger shifts forward this causes the belt reel to twist counter to the locking action. Because of the engagement of the detent pawl with the locking teeth and because of the rotation of the belt reel, the load on the bearing point is increased in toggle-lever-like fashion. With such a structure, yielding of the bearing point under a heavy load can be ensured only by means of a very massive embodiment, which leads to a pronounced increase in weight.

It is therefore the object of the invention to improve a seat belt retractor of this kind for seat belts of motor vehicles such that improved bracing of the detent pawl is made possible, as a result of which safe load-bearing when the belt reel is locked is possible, without requiring massive reinforcements in the vicinity of the bearing.

Moreover, the seat belt retractor of the invention should be capable of meeting all the demands currently made by law with regard to durability, strength and breaking load. This is especially true for the demands in terms of the static and/or dynamic breaking load when a seat belt is pulled out in a straight line. Meeting these needs was among others a reason why, until now, in the development of motor vehicles on a mass-production basis, plastics were not used for housing frames of seat belt retractors.

Because a contact face for the detent pawl is embodied in the housing frame, by which contact face the pivoting travel of the detent pawl is limited, a toggle-lever-like increase in the load to be borne by the housing frame can be limited. The lever ratios of the belt reel or of the locking teeth and the detent pawl are limited by this contact face in such a way as to prevent increasingly excessive stretching. A toggle-lever-like excessive increase in force because of the increasing angle of the two operative lever arms is avoided. Because of this contact face, there is moreover an improved load distribution of the forces introduced into the housing frame via the detent pawl.

If the width of the contact face is equivalent to at least the width of the associated detent pawl face, the load-bearing can be improved still further. In particular, load peaks are thereby avoided, and the deformation under load is reduced.

A circularly curved support face, which corresponds to an equivalent contour of the detent pawl, can additionally provide for improved bracing of this detent pawl. This bracing advantageously counteracts radial shifting of the detent pawl and protects the bearing of the detent pawl against being overloaded.

If this circularly curved support face is embodied such that the detent pawl does not come into contact until a predetermined load is exceeded, then fast pivoting of the detent pawl is made possible. As a result, the detent pawl can pivot in a manner that is substantially free of additional friction at the support face.

Bearing the load of the forces introduced into the housing frame via the detent pawl can be improved still further if the detent pawl is embodied as wider on its side toward the support face. That side is typically the side facing away from the set of locking teeth, and the side in which the pivot axis is located. A wider support face ensures improved load distribution at the support face. A widened detent pawl in the vicinity of the support face, with its thickness otherwise unchanged, leads to markedly better load distribution, with only a slight increase in the overall mass of the detent pawl. The increase in mass is moreover within the vicinity of the pivot axis, so that its mass inertia is not excessively increased.

The load introduction into the vehicle body and the loading on the housing frame are improved considerably if the detent pawl is disposed such that it is located between the shaft of the belt reel and the anchoring point of the seat belt retractor. As a result, very direct force introduction, in particular, is possible. A reinforced embodiment of the housing is thereby reduced to a relatively small region of the housing frame, so that the volume and mass of the housing frame remain small.

The rigidity of the housing frame and its breaking strength are advantageously improved if a reinforced region, which connects the support face for the detent pawl and the anchoring portion, is embodied on the housing frame. This improves the introduction of force from the load into the vehicle body via the detent pawl and the housing frame.

Especially suitable plastics for the housing frame of the seat belt retractor are those in the groups comprising duroplastics and thermoplastics, in particular polypropylene (PP), polyamide (PA), and above all PA6 and polyethylene (PE). For reinforcing these plastics, long glass fibers are advantageously employed.

As one embodiment of the invention, a seat belt retractor for seat belts of motor vehicles with a plastic housing frame for receiving a belt reel is made available, in which the housing frame is embodied as an open, U-shaped frame whose open face and/or inside diameter of the two side walls is markedly narrower than the associated belt reel, and a reinforcement plate is anchored to the face end.

In one exemplary embodiment of the invention, the middle leg of the housing frame is provided with an anchoring opening, with or without a thread, the thickness of which decreases by at least 30% from the upper end, adjacent to the anchoring opening, to the lower end.

In a further embodiment of the invention, the middle leg is provided at least partially with a honeycomb structure and/or with ribbing.

In a further exemplary embodiment of the present invention, at least in one side leg, there is an opening to enable lateral installation of the reel which is embodied without ring-like belt connectors.

In an exemplary embodiment of the invention, the reel body, with or without a set of teeth, is made from fiber-reinforced plastic.

In a further embodiment of the invention, a seat belt retractor is made available in which the locking wheel is made from fiber-reinforced plastic.

In a further exemplary embodiment of the present invention, circular indentations of at least 6.5 mm together for supporting the belt reel are embodied in the side legs, and at least one of these indentations is reinforced by a side wall.

In an exemplary embodiment of the invention, a seat belt retractor is made available in which at least one of the circular indentations is provided with a set of teeth.

In a further embodiment of the invention, a seat belt retractor is made available in which on the face ends of the side legs, indentations and/or protrusions are embodied, which for producing a positive connection correspond with equivalent indentations and/or protrusions (of the reinforcement plate.

In a further exemplary embodiment of the present invention, the middle leg and/or at least one of the side legs of the housing frame is provided with protrusions and/or detent elements for torsion prevention and/or for load-bearing and/or for reducing vibration.

In a further exemplary embodiment of the present invention, the plastic housing frame is also suitable for use for belt systems that are integrated in seats.

In a further exemplary embodiment of the present invention, the plastic housing frame is also suitable for use with a known form of seat belt tensioner.

In a further exemplary embodiment of the present invention, the plastic housing frame is also suitable for use with a known form of seat belt retractor-tensioner.

In a further exemplary embodiment of the present invention, the plastic housing frame is also suitable for use with a known form of end-fitting tensioner.

In a further exemplary embodiment of the present invention, the plastic housing frame is embodied in one piece with a known form of tensioner housing.

Further advantages and advantageous embodiments of the invention will become apparent from the dependent claims and the description.

BRIEF DESCRIPTION OF THE DRAWINGS

One exemplary embodiment of the invention is described below in further detail in conjunction with the drawings.

DETAILED DISCUSSION IN CONJUNCTION WITH THE DRAWINGS

Figure 1:
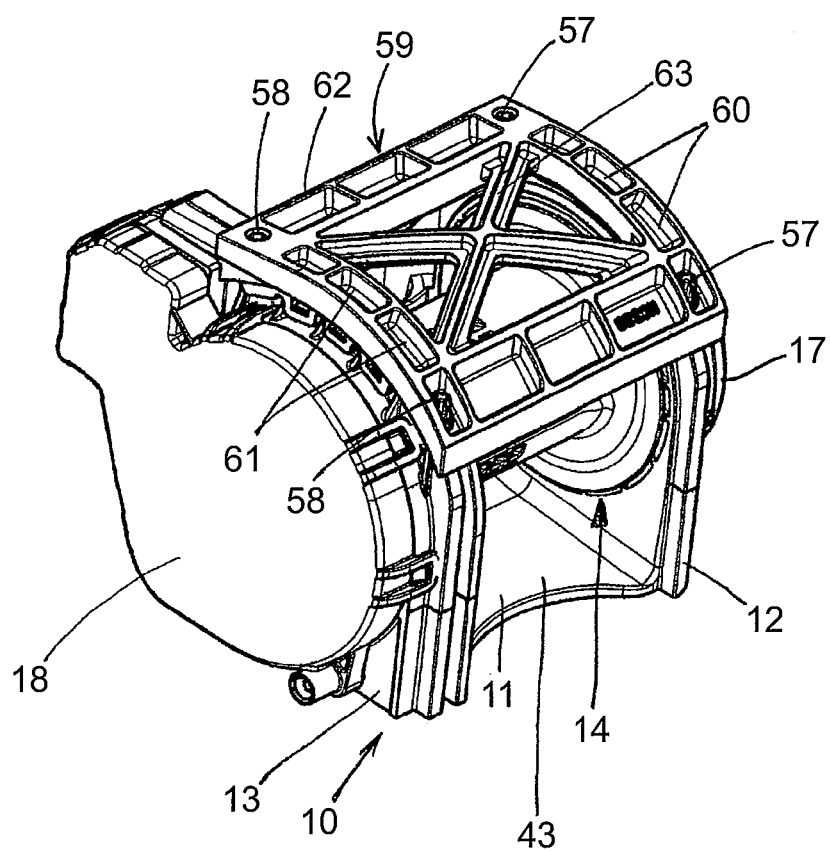
FIG. 1 is a perspective view of the seat belt retractor of the invention.
Figure 2:
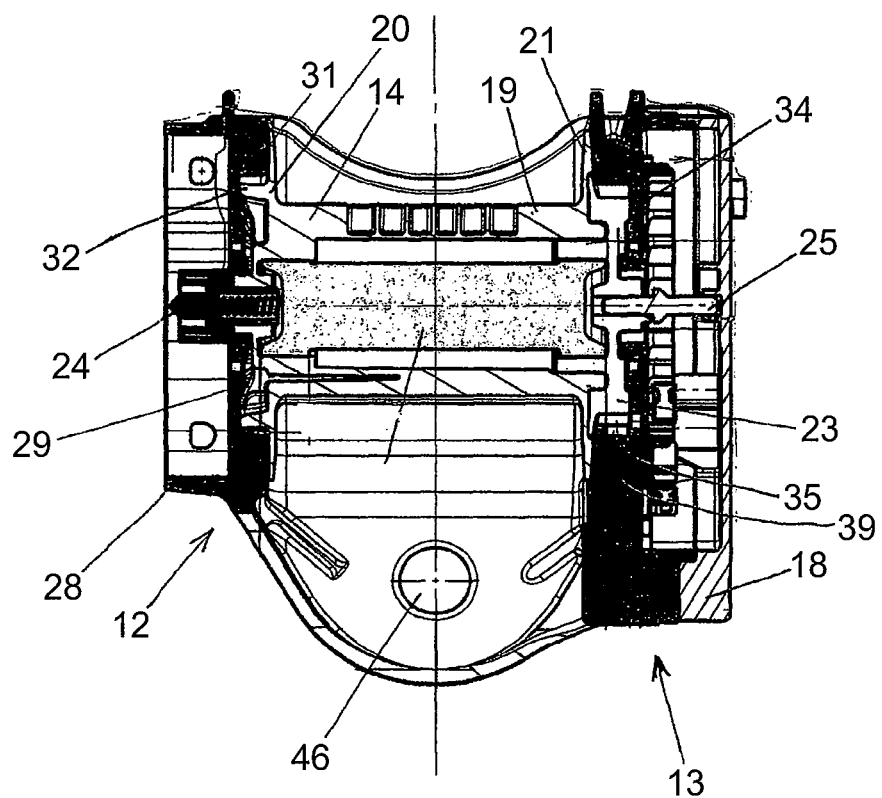
FIG. 2 is a cross section through the seat belt retractor of the invention.
Figure 3:
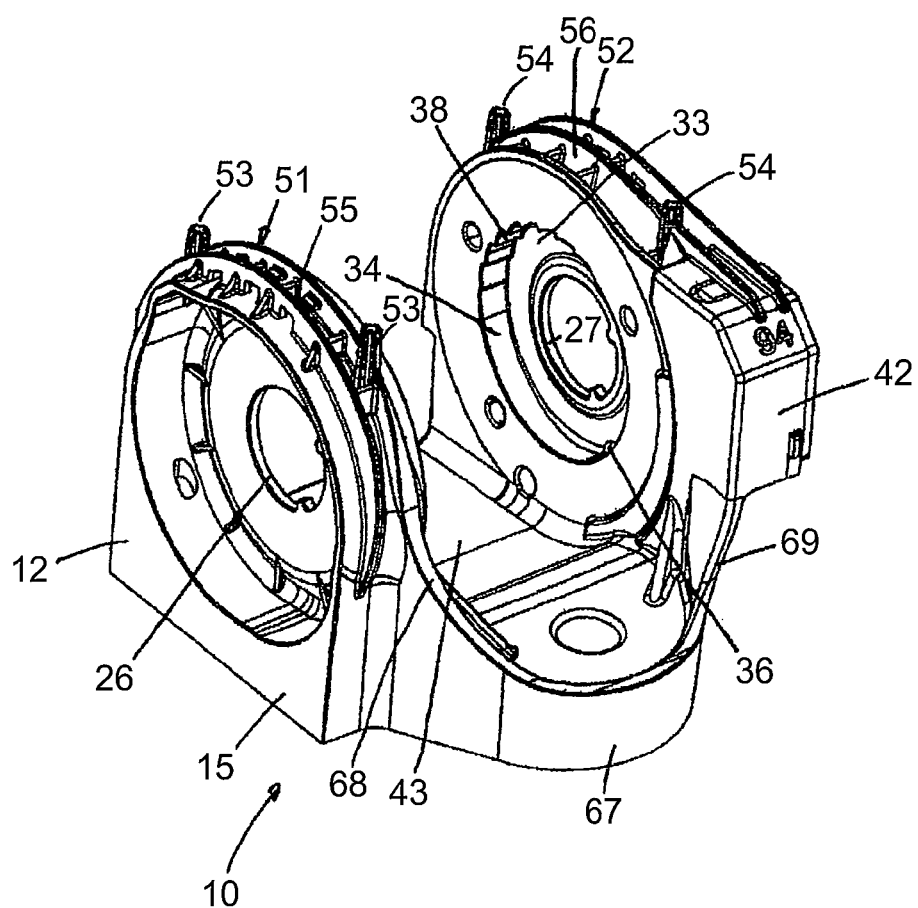
FIG. 3 is a first perspective view of the housing frame.
Figure 4:
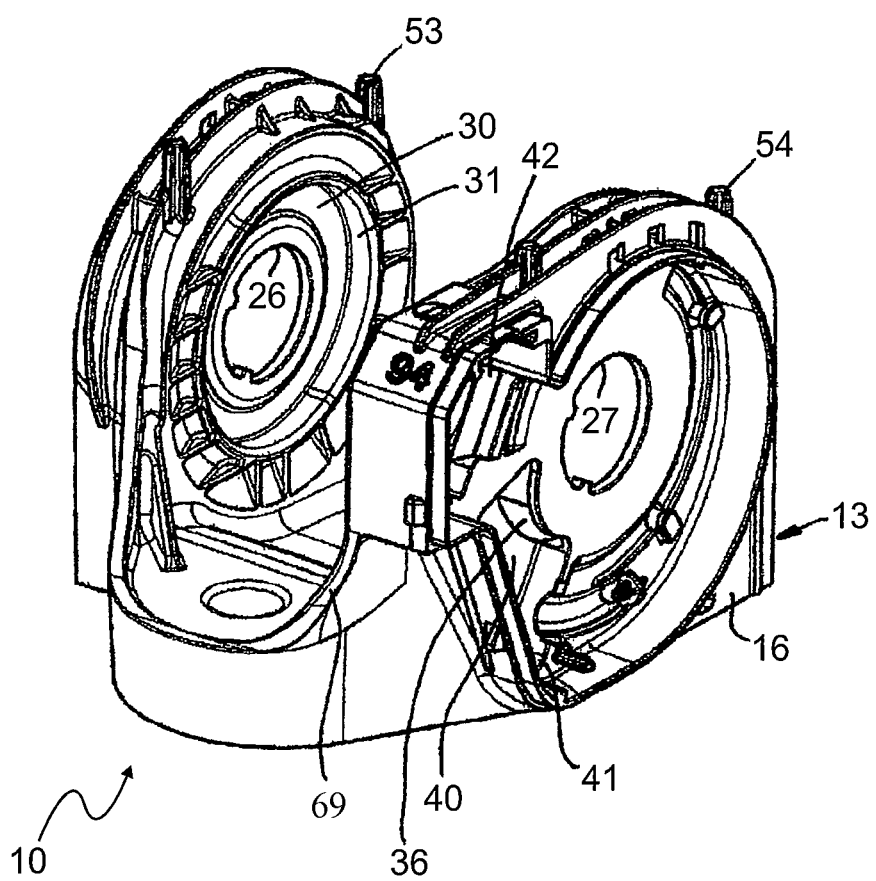
FIG. 4 is a second perspective view of the housing frame.

The seat belt retractor shown in FIGS. 1-13 has a housing frame 10, which is U-shaped, a middle leg 11 embodied as a base plate, and two side legs 12 and 13. A belt reel 14 is rotatably supported in this housing frame. The two outer sides 15 and 16 of the side legs 12 and 13 are closed by housing caps 17 and 18.

The belt reel, in a known manner, comprises a reel body 19 and two ringlike belt connectors 20 and 21. In the interior of the reel body 19 is a torsion bar 22, which is connected on one end to the belt reel in a manner fixed against relative rotation. The other end of the torsion bar 22 is connected to a locking wheel 23 that is guided laterally on the belt reel. The support of the belt reel in normal operation is effected on one face end via a sprung bearing pin 24, which is in a bearing receptacle in the housing cap. For passing the bearing pins 24 and 25 through them, the two side legs 12 and 13 each have a respective opening 26 and 27, whose diameter is substantially less than the diameter of the belt connectors 20 and 21.

In an alternative embodiment, a torsion bar 22 that is connected on one end to the belt reel in a manner fixed against relative rotation can be disposed in the interior of the reel body 19. The other end of the torsion bar 22 is connected to a locking wheel 23 that is guided laterally on the belt reel. If the reel lacks a torsion bar, then it is a known form of reel, without force limitation. Externally similarly to the reels 14 and 14/1, they can be embodied with or without annular rings 32 on both outsides, but preferably they have a set of teeth, like what the locking wheel 23 has, on both sides. Since in reels without force limitation greater torques are transmitted to the housing, the torque is preferably distributed by means of the second set of teeth to the second side leg 12, 13 as well, which leg contains a counterpart set of teeth that fits the reel. In a force-limiter version, the torque is absorbed on only one side. The support of the belt reel in normal operation is effected on one face end via a sprung bearing pin 24, which is in a bearing receptacle in the housing cap. For passing the bearing pins 24 and 25 through them, the two side legs 12 and 13 each have a respective opening 26 and 27, whose diameter is substantially less than the diameter of the belt connectors 20 and 21.

On the outside of the side leg 12, an encompassing housing edge 28 is embodied. This edge, together with the wall 29 of the side leg 12, forms a receiving chamber for a drive spring, not shown, which is connected to the belt reel via the bearing pin 24. The receiving chamber for the drive spring, formed by the housing edge 28 and the wall 29 of the side leg, is closed by the cap 17, which for reasons of weight is likewise made of plastic.

On the inner side of the side leg 12, a circular indentation 30 is embodied, whose encompassing edge 31 centrally surrounds the opening 26. This indentation 30 serves to receive a flangelike annular ring 32 on the outside of the belt reel 14.

The opposed inner side of the second side leg 13 likewise has a circular indentation 33 with an encompassing side edge 34, optionally with or without a set of teeth. This indentation serves to receive a flangelike annular edge 35 of the locking wheel. The lateral edge 34 is provided with an opening 36, through which a detent pawl 37, supported on the outside of the leg, protrudes into the interior of the housing frame or of the circular indentation 33. On the radially opposite side, the lateral edge 34 of the indentation 33 is provided with a set of teeth 38.

Given suitable triggering, the detent pawl 37 protruding into the indentation 33 cooperates with a set of teeth 39 on the outside of the locking wheel 23. Under load, the belt reel is then displaced, as a result of the lever actions that occur, into the set of teeth 38 on the housing wall. In an alternative form, under a jerky load, the belt reel is then displaced into the set of teeth 38 on the housing wall, either directly or as a result of the incidental lever actions that were tripped by the locking procedure.

The opposed indentation 30 can likewise be provided with a set of teeth, preferably whenever a torsion bar is dispensed with. In that case, the edge of the belt reel is likewise provided with a corresponding counterpart set of teeth.

On the outside of the side leg 13, in the vicinity of the opening 36, a receiving chamber 40 is embodied, which serves to receive the detent pawl 37. The wall of the receiving chamber 40 is embodied such that it forms a bracing face 41 for the detent pawl 37.

The side leg 13 additionally has a further receiving chamber 42, which serves to accommodate the mechanical sensor, not shown in further detail.

The middle leg 11 embodied as a base plate has a closed surface 43 on its side facing toward the belt reel 14, and on the opposite side it has an open honeycomb structure 44 for the sake of reinforcement and stiffening. On the upper end 45 of the middle leg, a circular passage 46 is also embodied, which serves to receive or allow the passage through it of the screw fastening used for anchoring purposes. The passage 46 is surrounded by a massively embodied edge 47. The thickness of the middle leg has its greatest size D in the vicinity of the upper end or in the vicinity of the annular edge 47 and decreases continuously in the direction of the lower end 48. Beginning at a region of equal thickness D around the passage 46 and the massive edge 47, the thickness of the middle leg decreases in the direction of the lower end. The contour of the middle leg, beginning at the region of equal thickness D, has a curved middle region 49, which is adapted to the contour of the belt reel and changes over into a lower region 50 that decreases nearly linearly in its thickness.

The thickness D of the middle leg is at least 10 mm in the vicinity of the circular passage. The spacing of the center axis of the circular passage 46 from the upper edge is advantageously at least 15 mm, or at least 10 mm to 15 mm. At the lower end of the middle leg, the thickness of this leg can be reduced to 4 mm or less.

Because of the relatively great thickness of the middle leg in the upper region, it is also possible to provide the passage 46 for the screw fastening with a thread, making it unnecessary to form a thread on or attach a threaded nut to the vehicle body.

Because of the reduction in thickness of the middle leg, the U-shaped housing frame can widen elastically more in the vicinity of the lower end 48 than in the vicinity of the upper end 45, the latter being reinforced for the sake of absorbing the anchoring forces. The belt reel 14 is introduced from the lower end of the housing frame, that is, the end that is widened more markedly during installation, so that the ring 32 of the belt reel and the edge 35 of the locking wheel 23 are received in the circular indentations 30 and 33. Once the belt reel has been inserted and the assembly tool has been removed, the side legs 12 and 13 resume their initial position, in which the belt reel is fixed in the axial direction.

The face ends 51 and 52, opposite the middle leg 11, of the two side legs each have two anchoring pins 53 and 54 and radially extending indentations 55 and 56. The anchoring pins 53 and 54 correspond to anchoring openings 57 and 58 of a reinforcement plate 59 by which, in the finally assembled state, the open face end of the U-shaped housing frame is closed. This reinforcement plate has a series of protrusions 60, 61, which correspond to the indentations 55 and 56 in the face ends of the legs. To increase the rigidity, the reinforcement plate is embodied in curved fashion and takes the form of a jacket face that radially surrounds the belt reel. The reinforcement plate essentially comprises a rectangular frame 62, which is arched in the circumferential direction of the belt reel. To achieve sufficient rigidity, the frame 62 is stiffened by an X-shape reinforcement rib 63.

To improve the installation in the vehicle and to avoid torsion of the seat belt retractor around the screw fastening point under load, hooklike protrusions 65 that correspond with equivalent openings in the vehicle body are embodied on the back side 64 of the middle leg. These protrusions can simultaneously act as aids in installation, with the aid of which the seat belt retractor is hung up into the vehicle body.

These protrusions 65 can moreover be designed such that they are load-bearing; that is, that loads can be introduced into the vehicle body via these protrusions. Thus the screw fastening point for the seat belt retractor can be relieved still further.

Figure 5:
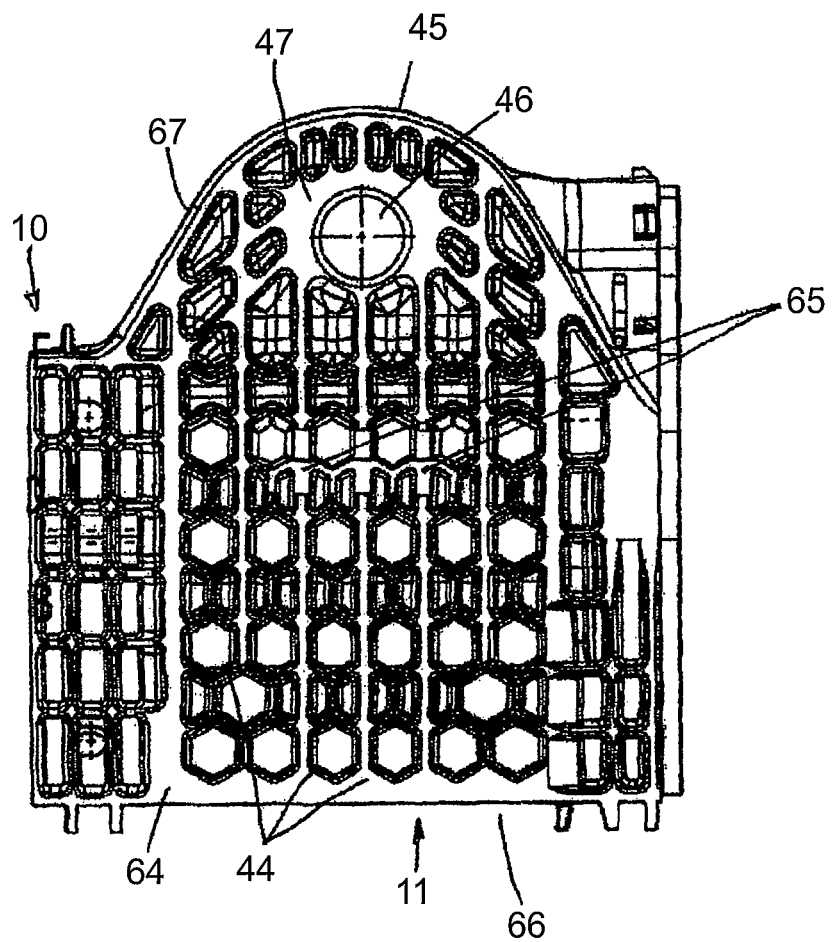
FIG. 5 is an elevation view of the back side of the middle housing leg.
Figure 6:
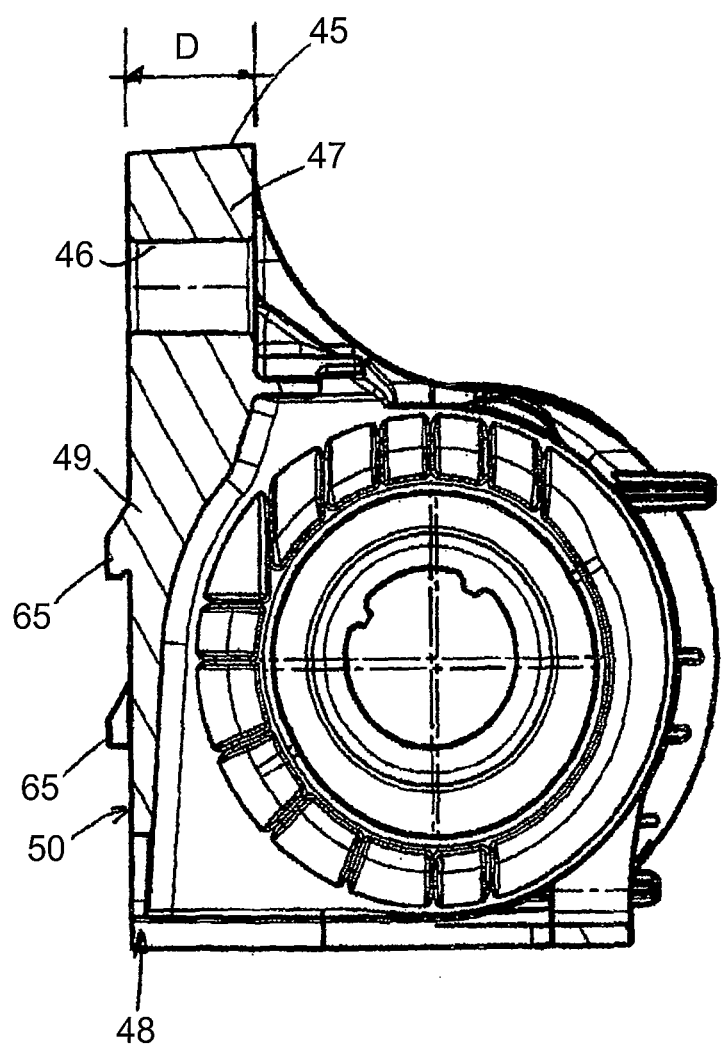
FIG. 6 is a longitudinal section through the housing frame.

As shown in FIG. 5, the middle leg 11, on its lower end 48, can have a straight edge 66 that connects the two side legs. However, it is also possible to embody this edge 66 in curved fashion, as shown in FIG. 1, where the curve extends in the direction of the anchoring point. As a result of this curved course, on the one hand the weight of the housing frame can be reduced, and on the other, the resistance to bending open as the belt reel is being assembled is reduced still further.

The edge 67 of the middle leg 11, beginning at the side legs, is arched outward in curved fashion around the passage 46 and its massive edge 47. The length of the middle leg, measured between its lower end 48 and its upper end 45, is greater than the corresponding length of the side legs. The curved edge 67 is preferably embodied in closed fashion. From that edge, curved transitions 68 and 69 extend into the side legs and increase the rigidity of the housing frame in its upper region. The curved transitions advantageously have a radius of at least 10 mm.

The frame and the reinforcement plate are of plastic which to increase its strength is reinforced, for instance with glass fibers. In particular, so-called long glass fibers are preferred.

Figure 7:
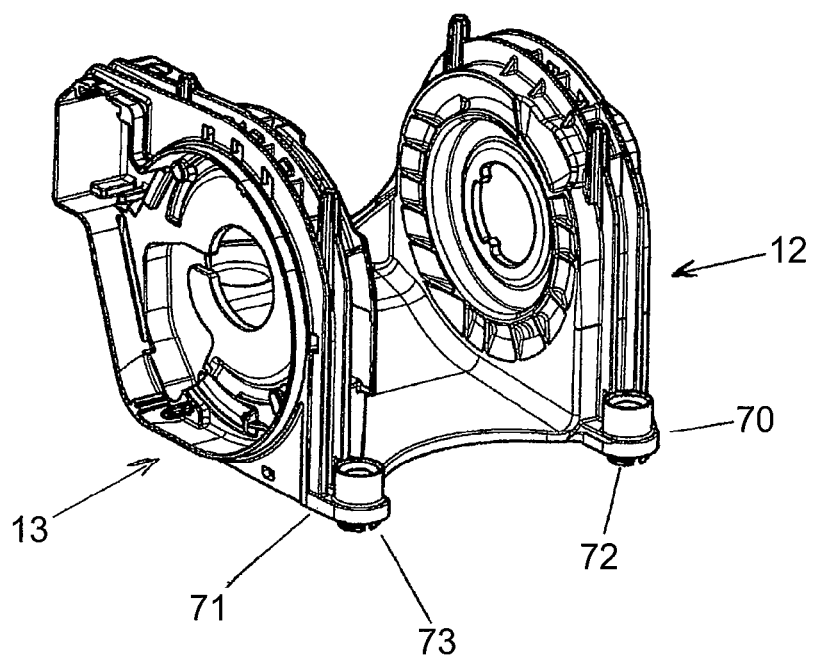
FIG. 7 is a perspective view of a second variant of the housing frame.

The variant of the housing frame shown in FIG. 7 differs from that described above in having additional anchoring elements, with which the seat belt retractor can be anchored to the vehicle body. On the side opposite the anchoring point, the side legs 12 and 13 each have a protrusion 70, 71, which is in the same plane as the middle leg. These protrusions, in this exemplary embodiment, protrude outward past the lower end of the middle leg. Detent elements 72, 73 are embodied on these protrusions and are embodied in one piece with the housing frame. These detent elements engage receiving openings, not shown, in the vehicle body or at the installation site and serve both as additional torsion prevention means and as additional load-bearing elements by which the loads occurring at the upper anchoring point can be reduced. In addition, with these additional anchoring elements, the vibration performance of the installed in seat belt retractor in the surroundings of the vehicle can be improved. The disposition of the detent elements 72, 73 here is merely an example. They can also be embodied at some other point on the side of either the side legs or the middle leg that faces toward the vehicle body. The disposition shown here has the advantage that together with the screw fastening in the vicinity of the passage 46, a three-point contact or anchor is obtained, which is especially stable and is advantageous in terms of its vibrational properties.

Figure 9:
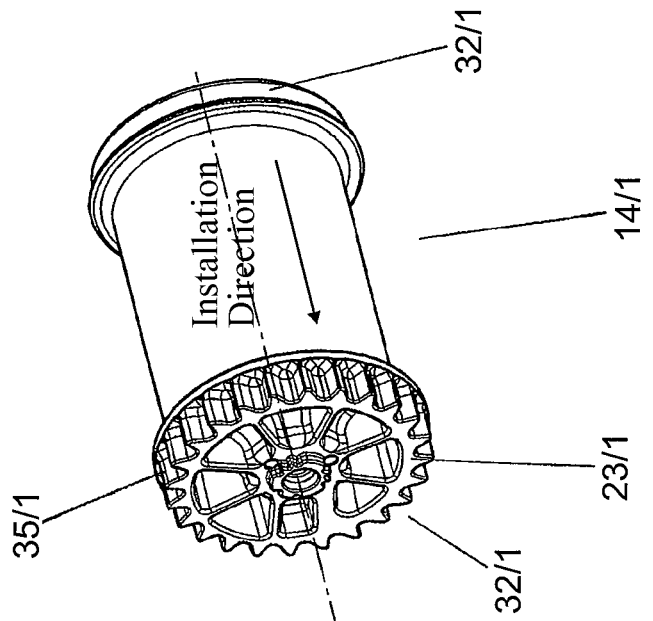
FIG. 9 shows the reel 14/1 without ringlike belt connectors, to enable it to be installed laterally in the housing frame.
Figure 8:
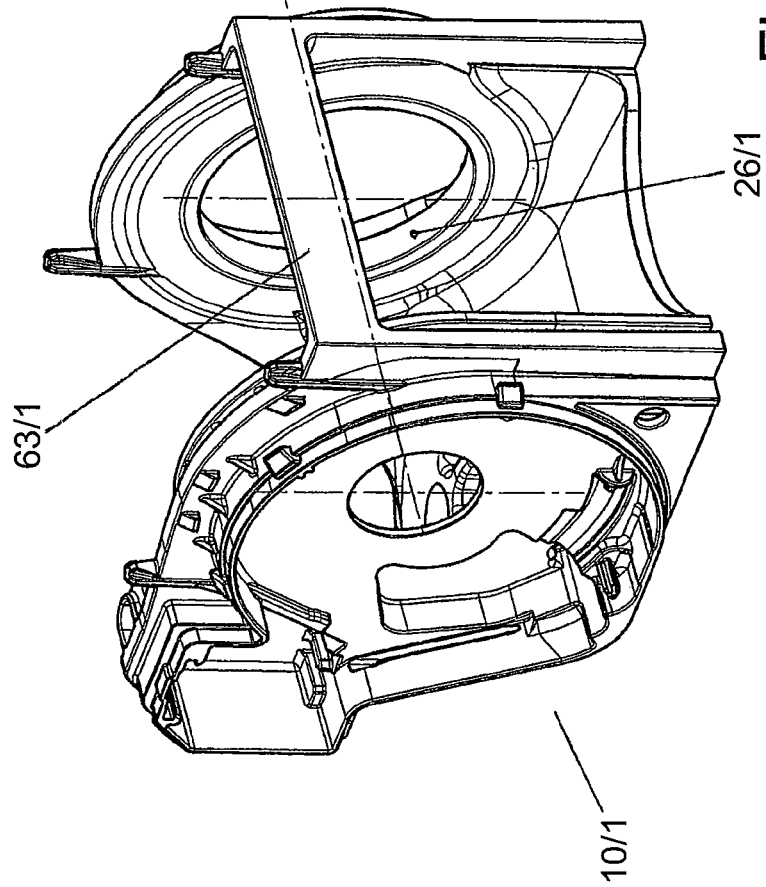
FIG. 8 is a perspective view of a further variant of the housing frame, which does not have to be bent open for installing the reel.
Figure 10:
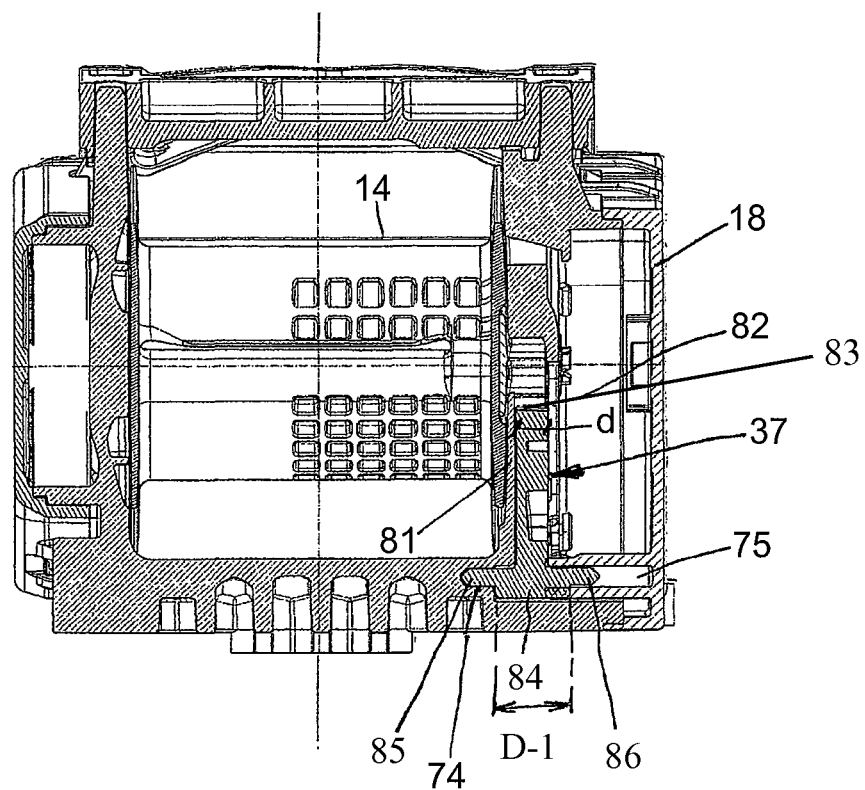
FIG. 10 is a cross section through the seat belt retractor of the invention in the vicinity of the detent pawl.
Figure 11:
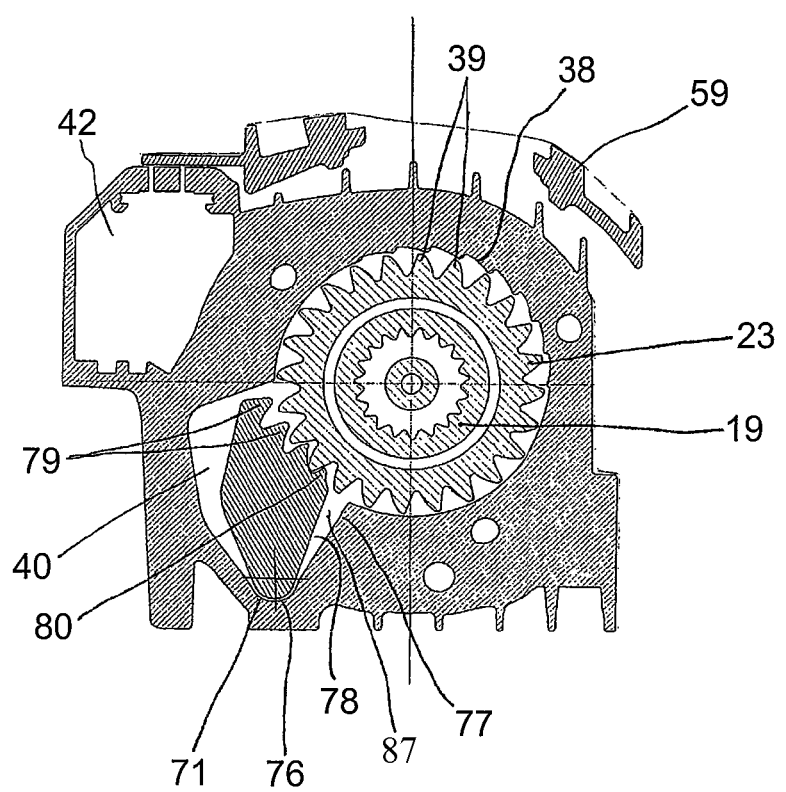
FIG. 11 is a longitudinal section through the seat belt retractor of the invention in the vicinity of the detent pawl.

FIG. 8 shows another variant of the housing frame, which does not have to be bent open for installing the reel. Specifically, housing frame 10/1 is provided with opening 26/1 to enable lateral installation of the reel 14/1 by providing that in one of the two side edges, preferably the one on the spring end, an opening is made through which the reel 14/1 can be inserted. As seen in FIG. 9, the reel 14/1 without ringlike belt connectors 20 and 21, is enabled to be installed laterally in the housing frame 10/1. Reel 14/1 has annular rings 32/1, and preferably has a set of teeth, like what the locking wheel 23/1 has, where annular rings 32/1 of the reel 14/1 and edges 35/1 of the locking wheel 23/1 are received in the housing 10/1. The housing frame 10/1 is prevented from being bent open due to the reinforcement rib 63/1 coupling the side legs together.

Figure 12:
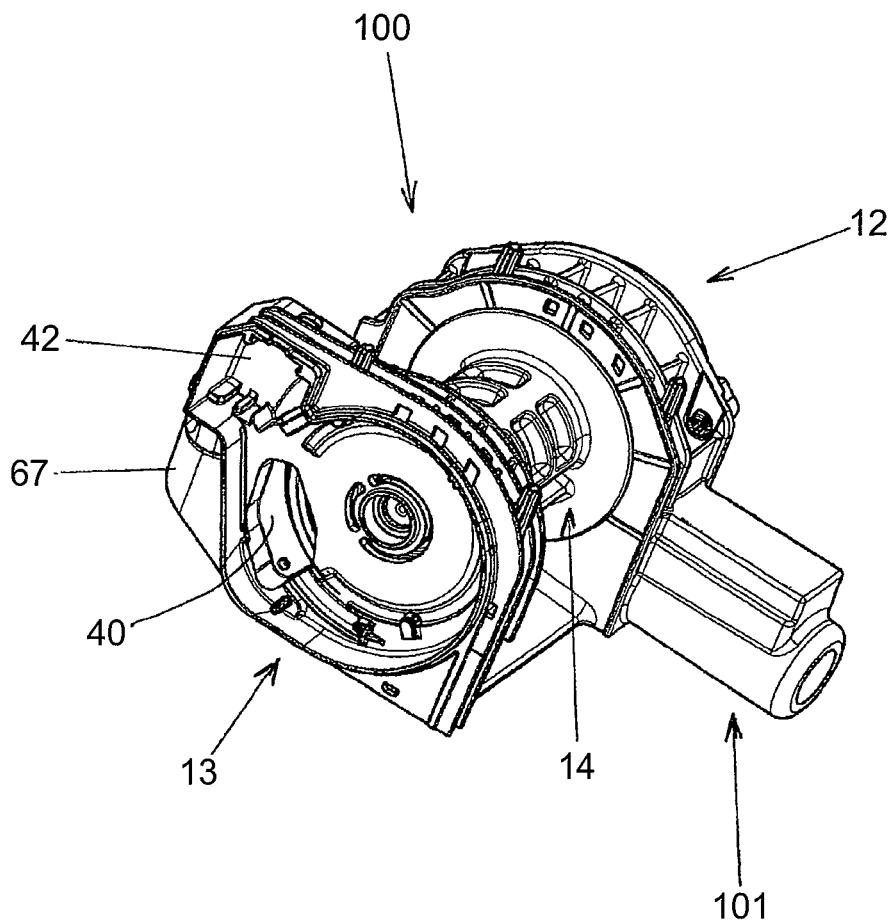
FIG. 12 is a perspective view of a plastic part which in one piece unites a tensioner housing and a housing frame 10.
Figure 13:
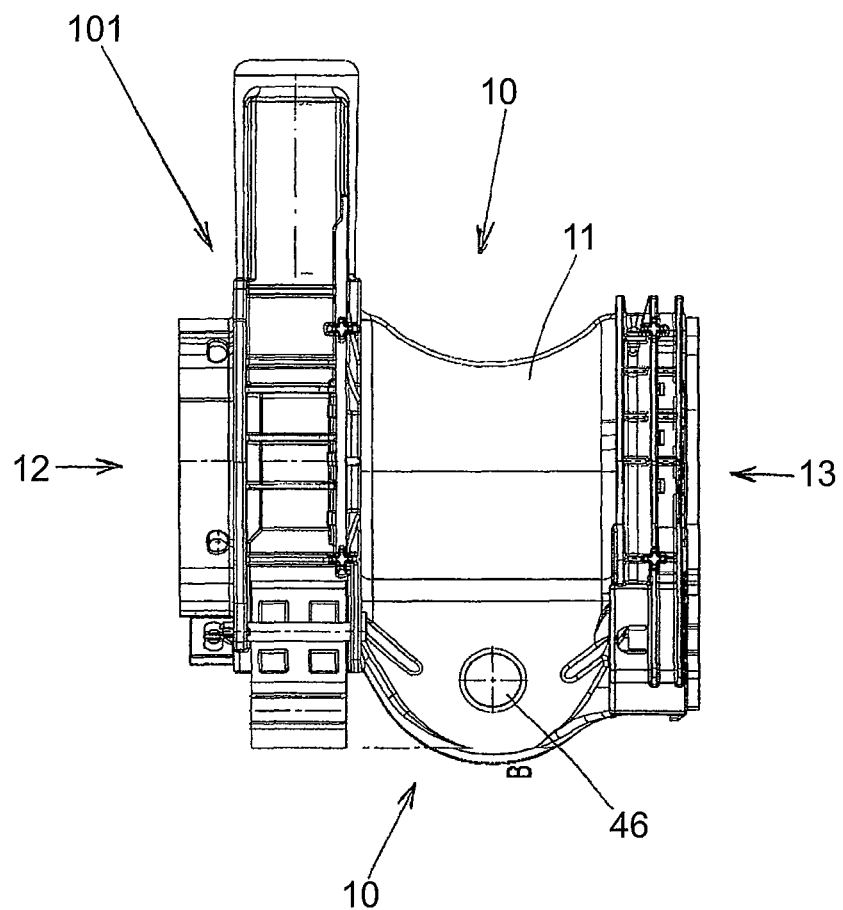
FIG. 13 is a top view on a plastic part which in one piece unites a tensioner housing and a housing frame.

The alternative embodiments of the housing frame 10 shown in FIGS. 12 and 13 differ from those described above in the additional function of embodying a known belt tensioner unit 101, for example, in one piece with a housing frame 10. The advantage is a considerable saving in both cost and weight compared to known belt tensioner systems. These embodiments are therefore extremely important, for instance in systems that are integrated into the seats, so as to avoid a high center of gravity in the seat back, or for vehicles that are optimized in terms of weight.

The detent pawl 37 has a toothed top portion 83, which cooperates with the set of teeth 39 of the locking wheel. The opposite bottom portion 84 has two bearing journals 85, 86 integrally formed on in one piece. One of the two bearing journals is guided in a bearing bore 74 of the housing frame. The opposite bearing journal is guided in a bearing bore 75 in the housing cap 18. Instead of the one-piece embodiment, it is also possible to embody a continuous bearing shaft as a separate component. The detent pawl can also be provided with bearing bores, into which corresponding bearing journals on the housing and on the housing cap are inserted, or through which a shaft is inserted.

The bottom portion 84 of the detent pawl is embodied as wider than the top portion 83. The thickness D-1 of the bottom portion in this exemplary embodiment is approximately twice the thickness d of the top portion. The thickness d of the top portion depends on the materials selected for the detent pawl and on the maximum forces to be borne and amounts in this exemplary embodiment to 4.4 mm. The opening width of the passage 36 depends on the thickness d of the top portion 83. This opening width is adapted to the thickness d of the top portion in such a way that the detent pawl protrudes through this passage without touching it. The side walls 81, 82 of the passage additionally serve to guide the detent pawl when there are major accelerations or forces in the transverse direction. Thus in every operating state, the overlap of the cooperating sets of teeth is preserved.

The receiving chamber 40 for the detent pawl has a support face 76, which faces toward the circularly curved bottom portion 84. The support face, in longitudinal section through the seat belt retractor, is likewise circularly curved and surrounds the bottom portion with a slight spacing 87. The spacing between the support face 76 and the bottom portion 84 is selected such that the supporting pawl can pivot without contacting the support face, as long as no load from the belt reel or the locking wheel is being transmitted to the detent pawl. Under load, the bearing bores and bearing journals can deform elastically, so that the bottom portion comes into contact with the support face and the support face can absorb the increased bearing forces.

The wall of the receiving chamber 40 located in the pivoting direction of the detent pawl is embodied as a contact face 77. The inclination of the contact face 77 is selected such that the side face 78, oriented toward it, of the detent pawl comes into flat contact with the contact face, if all the sets of teeth 79 of the detent pawl are meshing with the set of teeth of the locking wheel.

Upon pivoting of the detent pawl out of its position of repose, a first tooth 80, which is one of four teeth, of the set of teeth 79 meshes with the set of teeth of the locking wheel. By further rotation of the belt reel/the locking wheel, the detent pawl is pivoted farther, so that the other three teeth mesh with the teeth of the locking wheel as well. Because of the forces exerted on the belt reel via the belt as the belt is being pulled out, the belt reel is shifted in the direction of the set of teeth 38, so the set of teeth of the locking wheel meshes with that set 38. Once all the teeth of the detent pawl are in engagement, the detent pawl comes into contact with the contact face 77. Further pivoting and thus torsion of the locking wheel are then prevented.

The invention claimed is:

1. A seat belt retractor for seat belts of motor vehicles, having:
   a belt reel; and
   a housing frame of plastic for receiving said belt reel, wherein:
   said housing frame is embodied as an open, U-shaped frame, wherein a reinforcement plate of plastic is anchored to an open face end of the open, U-shaped frame, and
   said housing frame comprises a middle leg having an anchor opening at an upper end of the middle leg, wherein the upper end of the middle leg has a thickness larger than a thickness of a lower end of the middle leg on a side of the middle leg opposite the anchor opening and said thickness diminishes starting from the upper end adjacent the anchor opening towards the lower end of the middle leg so that a bending stiffness of the middle leg of the housing frame is reduced from the upper end to the lower end of the middle leg.

2. The seat belt retractor as defined by claim 1, further comprising side legs forming the housing frame, wherein:
   on face ends of said side legs, at least one of indentations or protrusions are embodied, which for producing a positive connection correspond with at least one of equivalent indentations or protrusions of said reinforcement plate.

3. The seat belt retractor as defined by claim 2, wherein:
   circular indentations for supporting said belt reel are embodied in said side legs.

4. The seat belt retractor as defined by claim 3, wherein:
   at least one of said circular indentations is provided with a set of teeth.

5. The seat belt retractor as defined by claim 1, wherein:
   said reinforcement plate is embodied in curved-arched fashion.

6. The seat belt retractor as defined by claim 1, wherein:
   said middle leg is provided at least partially with a honeycomb structure.

7. The seat belt retractor as defined by claim 1, wherein the housing frame further comprises two side legs, wherein:
   at least one of said middle leg or at least one of said side legs of said housing frame is provided with at least one of protrusions or detent elements for torsion prevention or for load-bearing.

8. A seat belt retractor for seat belts of motor vehicles, having:
   a belt reel; and
   a housing frame of plastic for receiving said belt reel, wherein:
   said housing frame having a detent pawl, supported on said housing frame, that cooperates with a set of locking teeth mounted directly or indirectly on said belt reel; and
   in said housing frame, a contact face for said detent pawl is embodied, by which the pivoting travel of said detent pawl is limited, and
   said housing frame comprises a middle leg having an anchor opening at an upper end of the middle leg, wherein the upper end of the middle leg has a thickness larger than a thickness of a lower end of the middle leg on a side of the middle leg opposite the anchor opening and said thickness diminishes starting from the upper end adjacent the anchor opening towards the lower end of the middle leg so that a bending stiffness of the middle leg of the housing frame is reduced from the upper end to the lower end of the middle leg.

9. The seat belt retractor as defined by claim 8, wherein:
   a support face adjoining said contact face and embodied in circularly curved-arched fashion is embodied in said housing frame.

10. The seat belt retractor as defined by claim 9, wherein:
    said support face surrounds said detent pawl with a slight spacing, so that said detent pawl does not come into contact with this support face until a predetermined load is exceeded.

11. The seat belt retractor as defined by claim 9, wherein:
    said detent pawl has a bottom portion of greater thickness, oriented toward said support face.

12. The seat belt retractor as defined by claim 8, wherein:
    said detent pawl is supported in one leg of said housing frame, and that a radially extending connecting line extends through said detent pawl, between a shaft of said belt reel and an anchoring point.

13. The seat belt retractor as defined by claim 12, wherein:
a reinforced region which connects said support face to said anchoring point is embodied on said housing frame.

14. The seat belt retractor as defined by claim 8, wherein: the width of said contact face is equivalent to at least the width of a face of said detent pawl.

15. The seat belt retractor as defined by claim 8, wherein: said set of locking teeth mounted on said belt reel cooperates with a further set of teeth embodied in said housing frame.

16. The seat belt retractor as defined by claim 8, wherein: said detent pawl has a set of teeth including at least four teeth.

17. A seat belt retractor for seat belts of motor vehicles, having:
a belt reel; and
a housing frame of plastic for receiving said belt reel, wherein:
said housing frame is embodied as an open, U-shaped frame with two side walls, wherein an open face end of said open, at least one of the U-shaped frame or the inside diameter of said two side walls is narrower than the belt reel, and a reinforcement plate is anchored to said open face end, and
said housing frame comprises a middle leg having an anchor opening at an upper end of the middle leg, wherein the upper end of the middle leg has a thickness larger than a thickness of a lower end of the middle leg on a side of the middle leg opposite the anchor opening and said thickness diminishes starting from the upper end adjacent the anchor opening towards the lower end of the middle leg so that a bending stiffness of the middle leg of the housing frame is reduced from the upper end to the lower end of the middle leg.

18. The seat belt retractor as defined by claim 17, wherein the thickness of the middle leg decreases by at least 30% from its upper end, adjacent to the anchor opening, to its lower end.

19. The seat belt retractor as defined by claim 17, wherein: said middle leg is provided at least partially with a honeycomb structure or with ribbing.

20. The seat belt retractor as defined by claim 17, wherein: in at least in one side leg, there is an opening to enable lateral installation of said belt reel, which is embodied without ring-like belt connectors.

21. The seat belt retractor as defined by claim 17, wherein: the belt reel, with or without a set of teeth, is made from fiber-reinforced plastic.

22. The seat belt retractor as defined by claim 17, wherein: the housing frame comprises a locking wheel made from fiber-reinforced plastic.

23. The seat belt retractor as defined by claim 17, wherein: circular indentations of at least 6.5 mm together for supporting said belt reel are embodied in side legs of the housing frame, and at least one of these indentations is reinforced by at least one of the side walls.

24. The seat belt retractor as defined by claim 17, wherein said housing frame further comprises two side legs, wherein:
at least one of said middle leg or at least one of said side legs of said housing frame is provided with at least one of protrusions or detent elements for torsion prevention or for load-bearing or for reducing vibration.

25. The seat belt retractor as defined by claim 17, wherein: said plastic housing frame is also suitable for use for belt systems that are integrated in seats.

26. The seat belt retractor as defined by claim 17, wherein: said plastic housing frame is also suitable for use with a known form of seat belt tensioner.

27. The seat belt retractor as defined by claim 17, wherein: said plastic housing frame is also suitable for use with a known form of seat belt retractor-tensioner.

28. The seat belt retractor as defined by claim 17, wherein: said plastic housing frame is also suitable for use with a known form of end-fitting tensioner.

29. The seat belt retractor as defined by claim 17, wherein: said plastic housing frame is embodied in one piece with a form of tensioner housing.

* * * * *